(12) United States Patent
Dave et al.

(10) Patent No.: US 12,368,820 B2
(45) Date of Patent: Jul. 22, 2025

(54) MACHINE LEARNING-BASED AUDIO MANIPULATION USING VIRTUAL BACKGROUNDS FOR VIRTUAL MEETINGS

(71) Applicant: Cisco Technology, Inc., San Jose, CA (US)

(72) Inventors: Urmil Dave, San Jose, CA (US); Dominik Rene Tornow, San Jose, CA (US); Kyle Andrew Donald Mestery, Woodbury, MN (US)

(73) Assignee: Cisco Technology, Inc., San Jose, CA (US)

( * ) Notice: Subject to any disclaimer, the term of this patent is extended or adjusted under 35 U.S.C. 154(b) by 428 days.

(21) Appl. No.: 17/513,033

(22) Filed: Oct. 28, 2021

(65) Prior Publication Data

US 2023/0132415 A1  May 4, 2023

(51) Int. Cl.
| | |
|---|---|
| *H04N 7/15* | (2006.01) |
| *G06N 20/00* | (2019.01) |
| *G06T 13/80* | (2011.01) |
| *G10L 19/26* | (2013.01) |
| *H04L 12/18* | (2006.01) |

(52) U.S. Cl.
CPC ............. *H04N 7/157* (2013.01); *G06N 20/00* (2019.01); *G06T 13/80* (2013.01); *G10L 19/26* (2013.01); *H04L 12/1822* (2013.01)

(58) Field of Classification Search
CPC ..... H04N 7/157; H04L 12/1822; G06N 20/00
See application file for complete search history.

(56) References Cited

U.S. PATENT DOCUMENTS

| | | | |
|---|---|---|---|
| 5,862,229 A | 1/1999 | Shimizu | |
| 10,248,744 B2 | 4/2019 | Schissler et al. | |
| 11,004,434 B2 | 5/2021 | Elkins | |
| 11,233,974 B1 * | 1/2022 | Adcock | H04N 7/157 |

(Continued)

FOREIGN PATENT DOCUMENTS

| | | |
|---|---|---|
| WO | 2008062198 | 5/2008 |
| WO | 2020139588 | 7/2020 |

OTHER PUBLICATIONS

"Impress your friends with funny voices in Zoom.US", online: https://support.audio4fun.com/tutorials/av-voice-changer-software-products/vcs-diamond-80-tutorials/1398-impress-your-friends-with-funny-voices-in-zoomus, accessed Oct. 1, 2021, 2 pages.

(Continued)

*Primary Examiner* — Amal S Zenati
(74) *Attorney, Agent, or Firm* — Behmke Innovation Group LLC; James M. Behmke

(57) ABSTRACT

In one embodiment, a videoconference service determines a selection of a virtual background for a videoconference from a particular participant of a plurality of participants in the videoconference. The videoconference service determines an audio context filter that is associated with a visual context of the virtual background. The videoconference service modifies an audio stream of the videoconference into a modified audio stream according to the audio context filter. The videoconference service presents, to the plurality of participants during the videoconference, the particular participant using the virtual background and the modified audio stream. In an embodiment, the videoconference service ascertains the visual context of the virtual background based on applying a machine learning model to the virtual background.

18 Claims, 12 Drawing Sheets

(56) References Cited

U.S. PATENT DOCUMENTS

| | | | |
|---|---|---|---|
| 11,677,575 B1* | 6/2023 | Libin | H04L 12/1822 |
| | | | 709/204 |
| 2015/0063572 A1* | 3/2015 | Gleim | G10L 25/72 |
| | | | 381/17 |
| 2018/0011627 A1* | 1/2018 | Siracusano, Jr. | H04L 65/80 |

OTHER PUBLICATIONS

"Voice Changer & Soundboard for Video Calls: ZOOM, Hangouts", online: https://www.voicemod.net/voice-changer-for-video-call-facetime/, accessed Oct. 1, 2021, 2 pages.

"Qosmo Imaginary Soundscapes", online: http://imaginarysoundscape2.qosmo.jp/, accessed Oct. 1, 2021, 1 page.

Krishna, Swapna, "AI adds background noise to Google Street View scenes", Jan. 8, 2018, 1 page, Yahoo Lifestyle, Verizon Media.

Pigeon, Dr. Ir. Stephane, "Welcome to Noises Online!", online: https://noises.online/, accessed Oct. 1, 2021, 4 pages.

Mncent, James, "Match any image with an imaginary soundscape using this AI-powered web app", online: https://www.theverge.com/2018/5/24/17388284/ai-web-app-imaginary-soundscapes, accessed Oct. 1, 2021, 1 page.

* cited by examiner

MACHINE LEARNING-BASED AUDIO MANIPULATION USING VIRTUAL BACKGROUNDS FOR VIRTUAL MEETINGS

TECHNICAL FIELD

The present disclosure relates generally to computer networks, and, more particularly, to machine learning-based audio manipulation using virtual backgrounds for virtual meetings.

BACKGROUND

Virtual meetings, by leveraging videoconference technologies, have become increasingly used. This is in part due to work environments' continued evolution towards remote work, where virtual meetings have become nearly the primary means for collaboration, productivity, etc. (and as substitutes for in-person meetings). In addition to work, virtual meetings have been used more and more for non-work settings, including for class instruction and connecting friends and family (to re-connect, share, and build memories).

Videoconference technologies have allowed participants to apply a virtual background (e.g., a masking) to their video feeds, allowing participants to replace or disguise their physical backgrounds with different images. Participants, recently, have also started using virtual backgrounds to express themselves by selecting images that match their personalities, reflects their moods, etc. These virtual backgrounds, due to solely being based on one of the five senses, vision, are limited in the amount of immersion and customization they are able to provide.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a videoconference service determines a selection of a virtual background for a videoconference from a particular participant of a plurality of participants in the videoconference. The videoconference service determines an audio context filter that is associated with a visual context of the virtual background. The videoconference service modifies an audio stream of the videoconference into a modified audio stream according to the audio context filter. The videoconference service presents, to the plurality of participants during the videoconference, the particular participant using the virtual background and the modified audio stream. In an embodiment, the videoconference service ascertains the visual context of the virtual background based on applying a machine learning model to the virtual background.

Other embodiments are described below, and this overview is not meant to limit the scope of the present disclosure.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
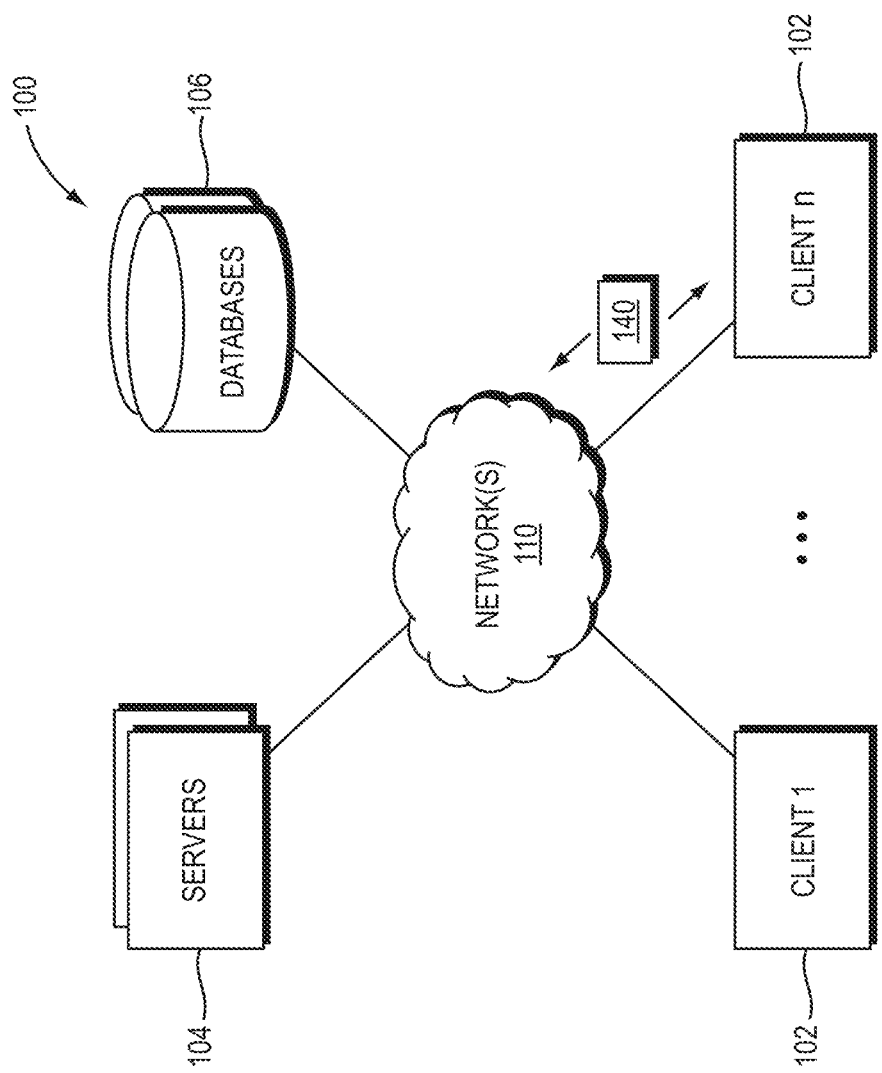
FIG. 1 illustrates an example communication network.

FIG. 1 is a schematic block diagram of an example simplified computing system 100 illustratively comprising any number of client devices 102 (e.g., a first through nth client device), one or more servers 104, and one or more databases 106, where the devices may be in communication with one another via any number of networks 110. The one or more networks 110 may include, as would be appreciated, any number of specialized networking devices such as routers, switches, access points, etc., interconnected via wired and/or wireless connections. For example, devices 102-104 and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, collaboration endpoints, or any other form of computing device capable of participating with other devices via network(s) 110.

Notably, in some embodiments, servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art.

Those skilled in the art will also understand that any number of nodes, devices, links, etc. may be used in computing system 100, and that the view shown herein is for simplicity. Also, those skilled in the art will further understand that while the network is shown in a certain orientation, the computing system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

Figure 2:
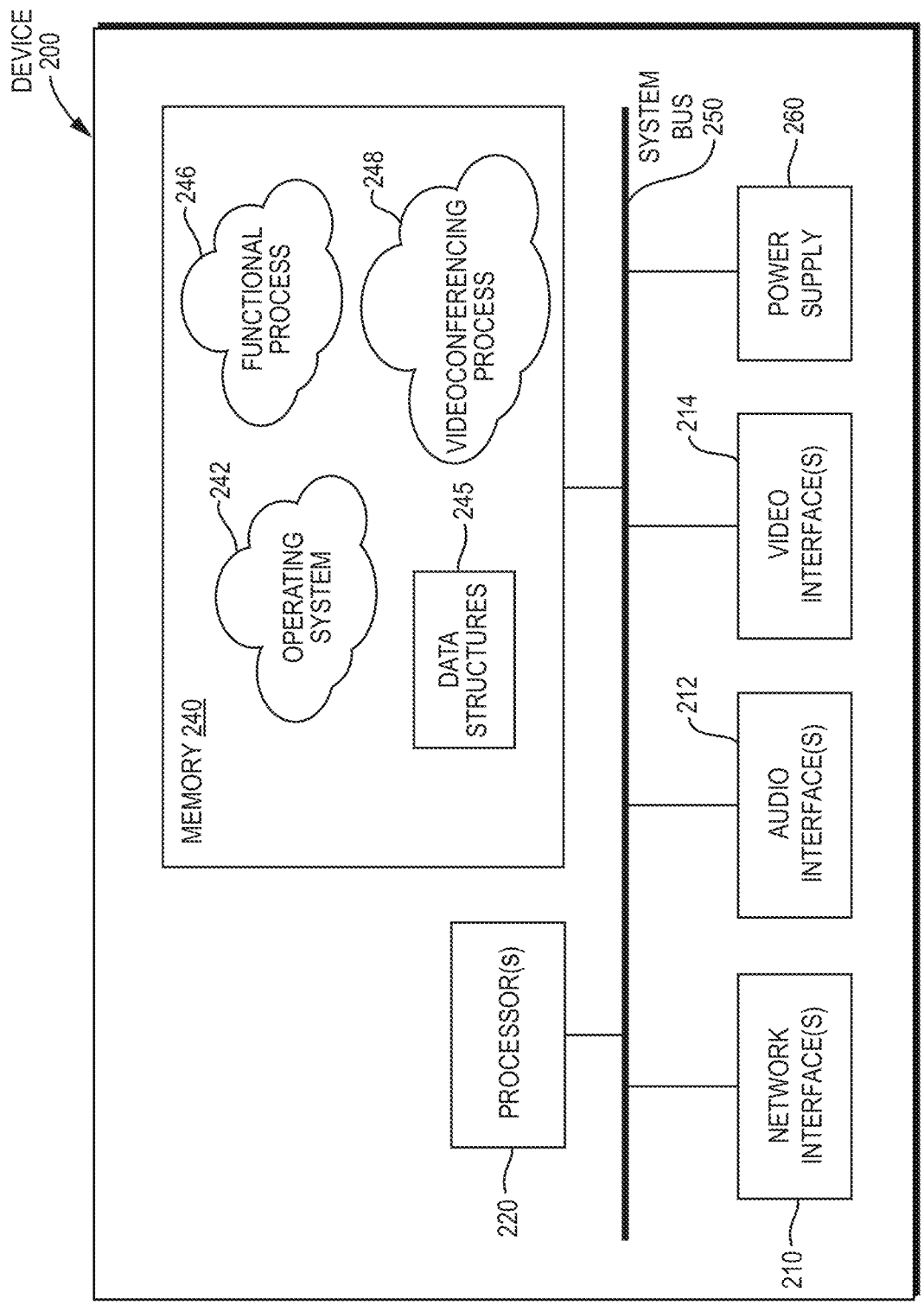
FIG. 2 illustrates an example network device/node.

FIG. 2 is a schematic block diagram of an example node/device 200 that may be used with one or more embodiments described herein, e.g., as any of the devices 102-106 shown in FIG. 1 above. Device 200 may also be any other suitable type of device depending upon the type of network architecture in place, such as a collaboration endpoint, IoT nodes, etc. Device 200 comprises one or more network interface 210, one or more audio interfaces 212, one or more video interfaces 214, one or more processors 220, and a memory 240 interconnected by a system bus 250, and is powered by a power supply 260.

The network interfaces 210 include the mechanical, electrical, and signaling circuitry for communicating data over physical links coupled to the network(s) 110. The network interfaces may be configured to transmit and/or receive data using a variety of different communication protocols. Note, further, that device 200 may have multiple types of network connections via interfaces 210, e.g., wireless and wired/physical connections, and that the view herein is merely for illustration.

The audio interfaces 212 may include the mechanical, electrical, and signaling circuitry for transmitting and/or receiving audio signals to and from the physical area in which device 200 is located. For instance, audio interfaces 212 may include one or more speakers and associated circuitry to generate and transmit soundwaves. Similarly, audio interfaces 212 may include one or more microphones and associated circuitry to capture and process soundwaves.

The video interfaces 214 may include the mechanical, electrical, and signaling circuitry for displaying and/or capturing video signals. For instance, video interfaces 214 may include one or more display screens. At least one of the display screens may comprise a touch screen, such as a resistive touchscreen, a capacitive touchscreen, an optical touchscreen, or other form of touchscreen display, to allow a user to interact with device 200. In addition, video interfaces 214 may include one or more cameras, allowing device 200 to capture video of a user for transmission to a remote device via network interfaces 210. Such cameras may be mechanically controlled, in some instances, to allow for repositioning of the camera, automatically.

The memory 240 comprises a plurality of storage locations that are addressable by the processor(s) 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise a one or more functional processes 246, and on certain devices, an illustrative videoconferencing process 248, as described herein. Notably, functional processes 246, when executed by processor(s) 220, cause each particular device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

During execution, videoconferencing process 248 may be configured to allow device 200 to participate in a virtual meeting (which may from time to time be referred as a videoconference) during which video data captured by video interfaces 214 and audio data captured by audio interfaces 212 is exchanged with other participating devices of the virtual meeting (or a videoconference) via network interfaces 210. In addition, videoconferencing process 248 may provide audio data and/or video data captured by other participating devices to a user via audio interfaces 212 and/or video interfaces 214, respectively. As would be appreciated, such an exchange of audio and/or video data may be facilitated by a videoconferencing service (e.g., Webex by Cisco Systems, Inc., etc.) that may be hosted in a data center, the cloud, or the like.

Figure 3:
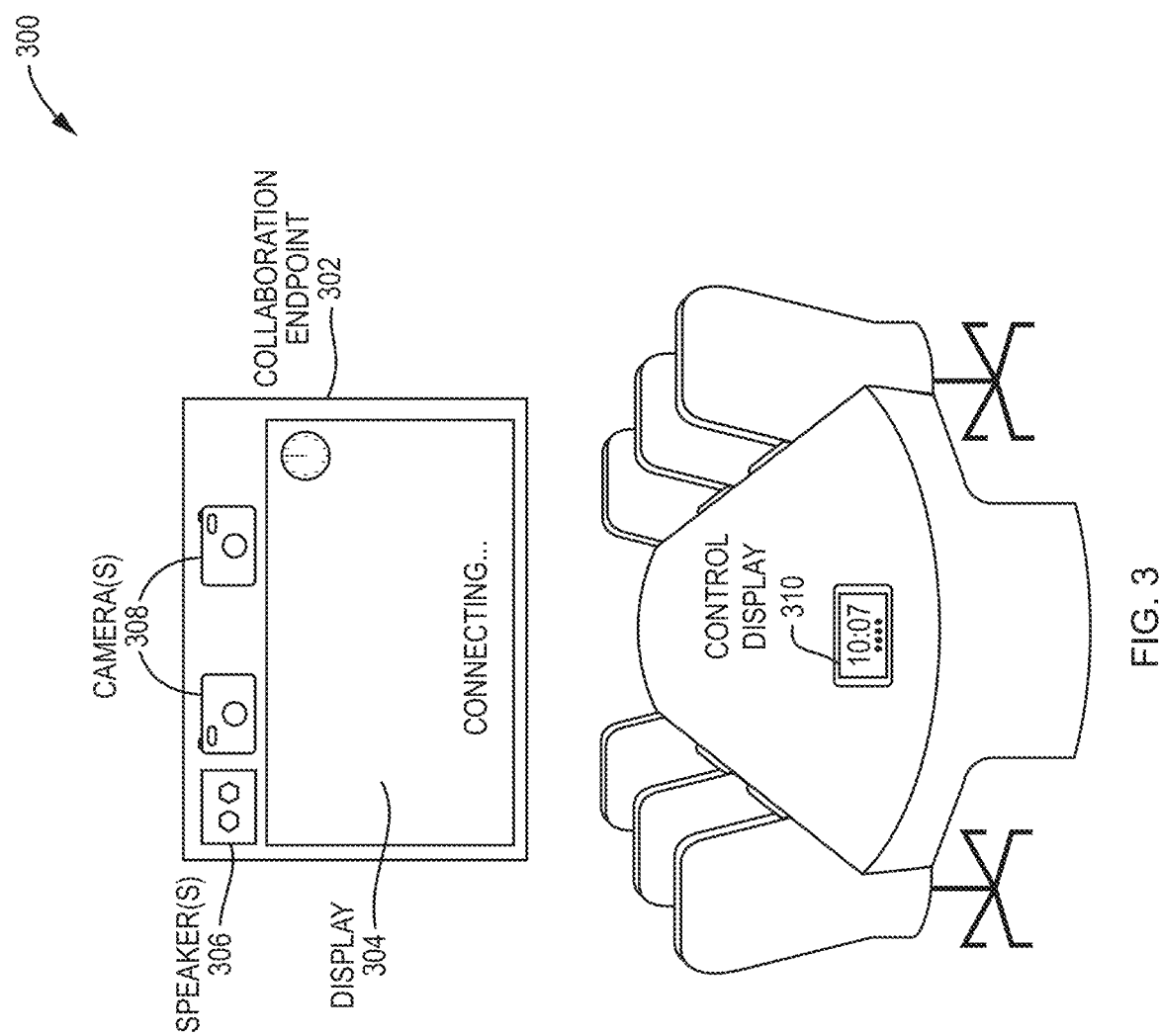
FIG. 3 illustrates various example components of a videoconferencing system.

FIG. 3 illustrates an example meeting room 300 in which a collaboration endpoint 302 is located, according to various embodiments. During operation, collaboration endpoint 302 may capture video via its one or more cameras 308, audio via one or more microphones, and provide the captured audio and video to any number of remote locations (e.g., other collaboration endpoints) via a network. Such videoconferencing may be achieved via a videoconferencing/management service located in a particular data center or the cloud, which serves to broker connectivity between collaboration endpoint 302 and the other endpoints for a given meeting. For instance, the service may mix audio captured from different endpoints, video captured from different endpoints, etc., into a finalized set of audio and video data for presentation to the participants of a virtual meeting (or a videoconference). Accordingly, collaboration endpoint 302 may also include a display 304 and/or speakers 306, to present such data to any virtual meeting (or a videoconference) participants located in meeting room 300.

Also as shown, a control display 310 may also be installed in meeting room 300 that allows a user to provide control commands for collaboration endpoint 302. For instance, control display 310 may be a touch screen display that allows a user to start a virtual meeting, make configuration changes for the videoconference or collaboration endpoint 302 (e.g., enabling or disabling a mute option, adjusting the volume, etc.)

In some cases, any of the functionalities of collaboration endpoint 302, such as capturing audio and video for a virtual meeting (or a videoconference), communicating with a videoconferencing service, presenting videoconference data to a virtual meeting participant, etc., may be performed by other devices, as well. For instance, a personal device such as a laptop computer, desktop computer, mobile phone, tablet, or the like, may be configured to function as an endpoint for a videoconference (e.g., through execution of a videoconferencing client application), in a manner similar to that of collaboration endpoint 302.

Figure 4:
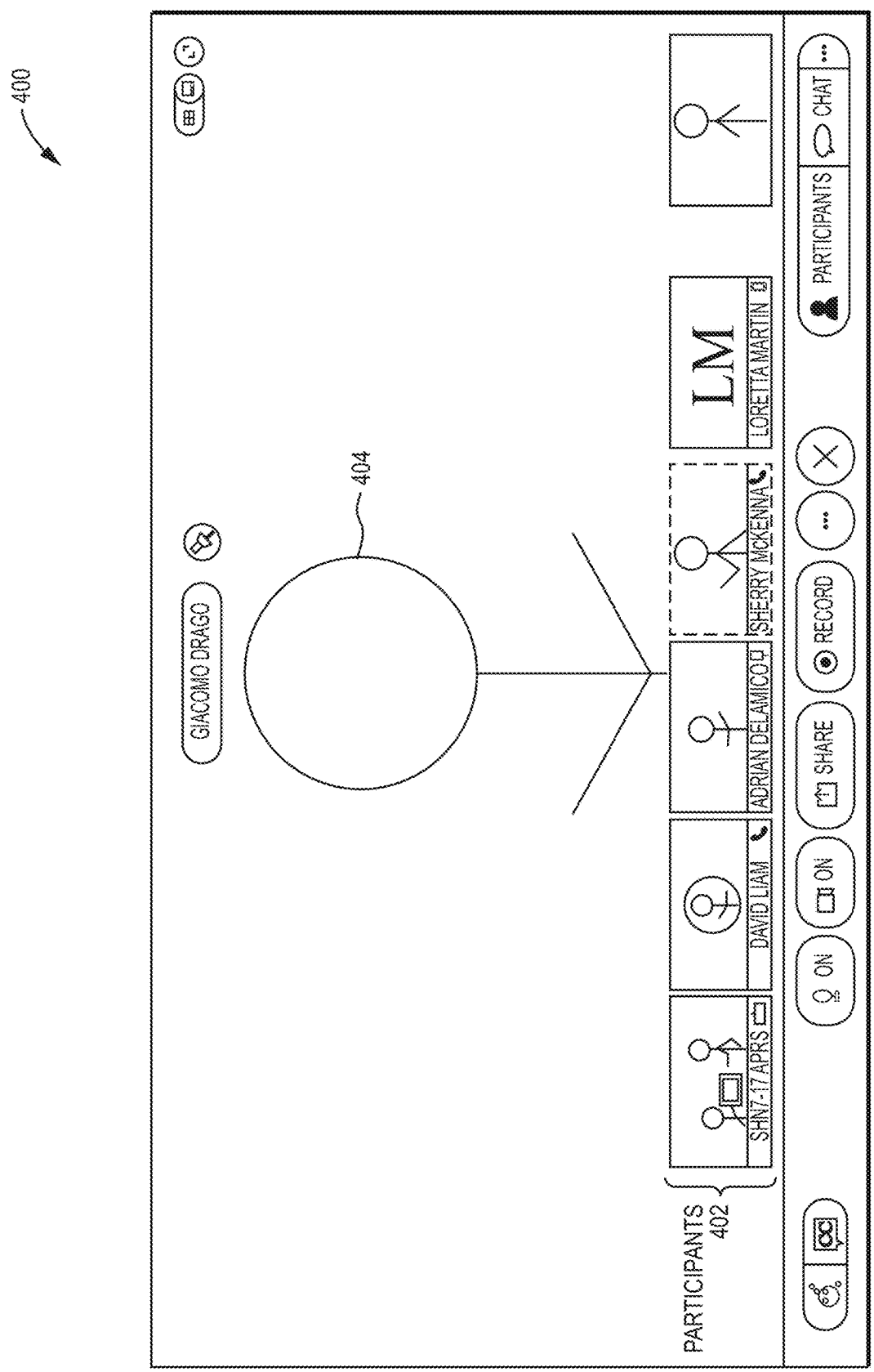
FIG. 4 illustrates an example display of a virtual meeting (or a videoconference)

FIG. 4 illustrates an example display of a virtual meeting (or a videoconference) 400, according to various embodiments. As shown, video for participants 402 may be presented in conjunction with that of a presenter 404. For instance, video data for each of participants 402 (e.g., video captured by each of their respective cameras) may be presented along the bottom of the displayed conference, along a side of the displayed conference, or the like. Typically, the host or presenter of the videoconference, may be displayed in a prominent location on screen, with their video appearing much larger than that of participants 402. This may be considered a stage or presenter mode of the virtual meeting. However, other presentation modes are contemplated, for instance, where each participant shares an equal amount of the displayed conference. Participants of a videoconference typically have limited control over their video streams during a virtual meeting, which can create additional overhead for the system. For instance, the videoconferencing service may allow participants 402 and/or presenter 404 to apply a masking to their video feeds, to replace their physical backgrounds with different images (e.g., a participant working from home may instead appear to the other participants as being located on the beach).

—Audio Manipulation for Virtual Backgrounds—

As noted above, virtual meetings, by leveraging videoconference technologies, have become increasingly used, particularly due to remote work environments, as well as for non-work settings (e.g., classrooms, families, friends, etc.). To participate in virtual meetings, participants may be able to join by executing a corresponding application on their personal devices, such as computers, mobile phones, or the like. In addition, collaboration equipment, such as videoconferencing equipment found in meeting rooms, kiosks, and the like are becoming increasing ubiquitous in many settings.

Videoconference technologies have allowed participants to apply a virtual background (e.g., a masking) to their video feeds, to replace their physical backgrounds with different images (e.g., a participant working from home may instead appear to the other participants as being located on the beach). Virtual meeting participants, by using virtual backgrounds, have been able to disguise their physical backgrounds with varying levels of success. Participants, recently, have also started using virtual backgrounds to express themselves by selecting images that match their personalities, reflect their moods, etc. These virtual backgrounds, due to solely being based on one of the five senses, vision, are limited in the amount of immersion and customization they are able to provide. That is, in cases of a participants attempting to, using virtual backgrounds, either to disguise their physical backgrounds or to express themselves, videoconference technologies have been developed with a focus only on the visual aspect of virtual backgrounds.

The techniques herein, therefore, enable automatic manipulation of an audio stream of a virtual meeting participant based on the participant's selection of a particular virtual background, in addition to applying the virtual background to a video stream of the participant. In particular, machine learning techniques may be leveraged to map any virtual background (that is selected by a participant) to sound files, audio enhancements/modifications, etc. that may enhance how the participant is perceived in the virtual meeting by other participants (when using the virtual background). In an example, the participant may select a virtual background of a fish aquarium, and a videoconference service, as described in greater detail herein, may, using machine learning, identify a visual context of the virtual background and then audio enhancements that are associated with the visual context. The participant, when participating in the virtual meeting with the virtual background, may then be presented with his or her audio being modified with the audio enhancements (in addition to the virtual background). In the example of the fish aquarium virtual background, for instance, bubble sounds (e.g., audio clips) may be added to the participant's audio stream and/or the participant's voice may be augmented such that it appears that the participant is under water.

It is contemplated that a level of the modification of the participant's audio stream may need to be modulated, taking into account the participant's and other participants' desires. In one or more embodiments, various toggles may be provided by the videoconference service such that modifications to an audio stream of a participant may be end user configured. Further, rotating virtual backgrounds and/or animated virtual backgrounds are contemplated, such that modifications to a participant' audio stream can take into account objects located within the virtual backgrounds. In addition, differing modes of a virtual meeting, for example, a (shared) themed meeting, a stage (or presenter) mode, a waiting room/lobby mode, etc., are contemplated such that modifications to one or more participants' audio streams are correspondingly applied.

Specifically, according to one or more embodiments described herein, a videoconference service determines a selection of a virtual background for a videoconference from a particular participant of a plurality of participants in the videoconference. The videoconference service determines an audio context filter that is associated with a visual context of the virtual background. The videoconference service modifies an audio stream of the videoconference into a modified audio stream according to the audio context filter. The videoconference service presents, to the plurality of participants during the videoconference, the particular participant using the virtual background and the modified audio stream. In an embodiment, the videoconference service ascertains the visual context of the virtual background based on applying a machine learning model to the virtual background.

Notably, the techniques herein may employ any number of machine learning techniques, such as to classify one or more virtual backgrounds, visual contexts (associated with the virtual backgrounds), and/or audio context filters (associated with the virtual backgrounds) and to cluster the data as described herein. In general, machine learning is concerned with the design and the development of techniques that receive empirical data as input (e.g., collected metric/event data from agents, sensors, etc.) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a, b, c such that the number of misclassified points is minimal. After this optimization/learning phase, the techniques herein can use the model M to classify new data points. Often, M is a statistical model, and the cost function is inversely proportional to the likelihood of M, given the input data.

One class of machine learning techniques that is of particular use herein is clustering. Generally speaking, clustering is a family of techniques that seek to group data according to some typically predefined or otherwise determined notion of similarity.

Also, the performance of a machine learning model can be evaluated in a number of ways based on the number of true positives, false positives, true negatives, and/or false negatives of the model.

In various embodiments, such techniques may employ one or more supervised, unsupervised, or semi-supervised machine learning models. Generally, supervised learning entails the use of a training set of data, as noted above, that is used to train the model to apply labels to the input data. On the other end of the spectrum are unsupervised techniques that do not require a training set of labels. Notably, while a supervised learning model may look for previously seen patterns that have been labeled as such, an unsupervised model may attempt to analyze the data without applying a label to it. Semi-supervised learning models take a middle ground approach that uses a greatly reduced set of labeled training data.

Example machine learning techniques that the techniques herein can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) artificial neural networks (ANNs) (e.g., for non-linear models), replicating reservoir networks (e.g., for non-linear models, typically for time series), random forest classification, or the like.

Figure 5A:
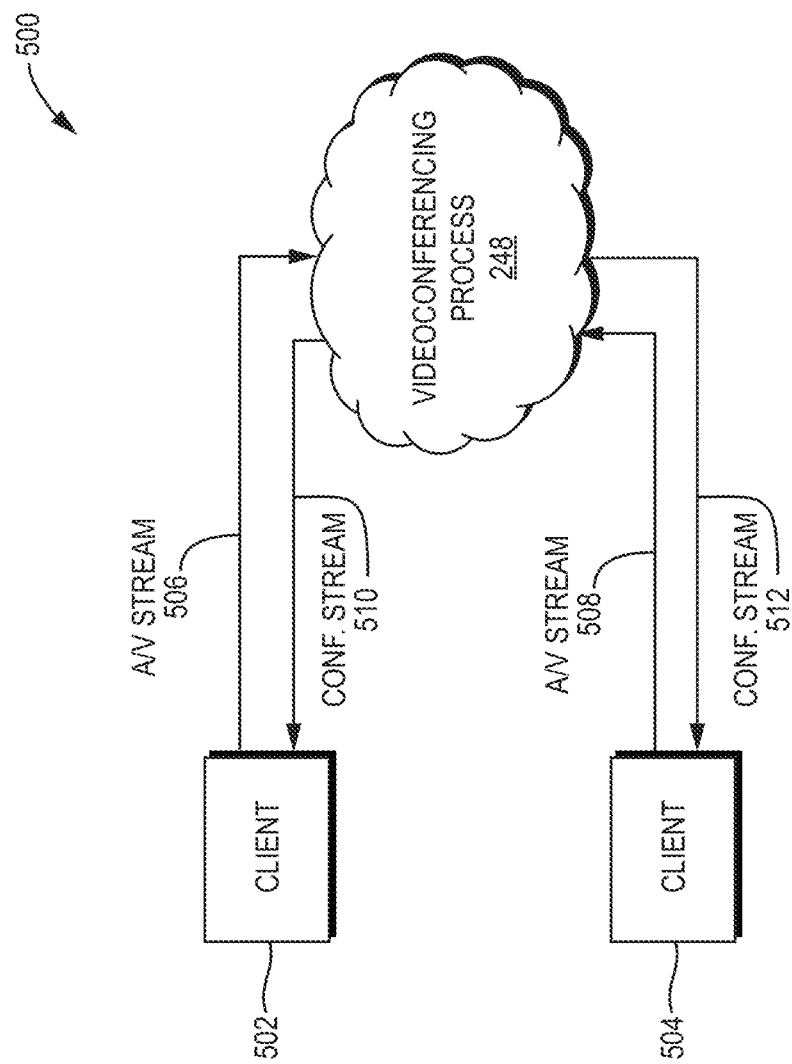
FIGS. 5A-5C illustrate an example architecture for machine learning-based audio manipulation using virtual backgrounds for virtual meetings.
Figure 5B:
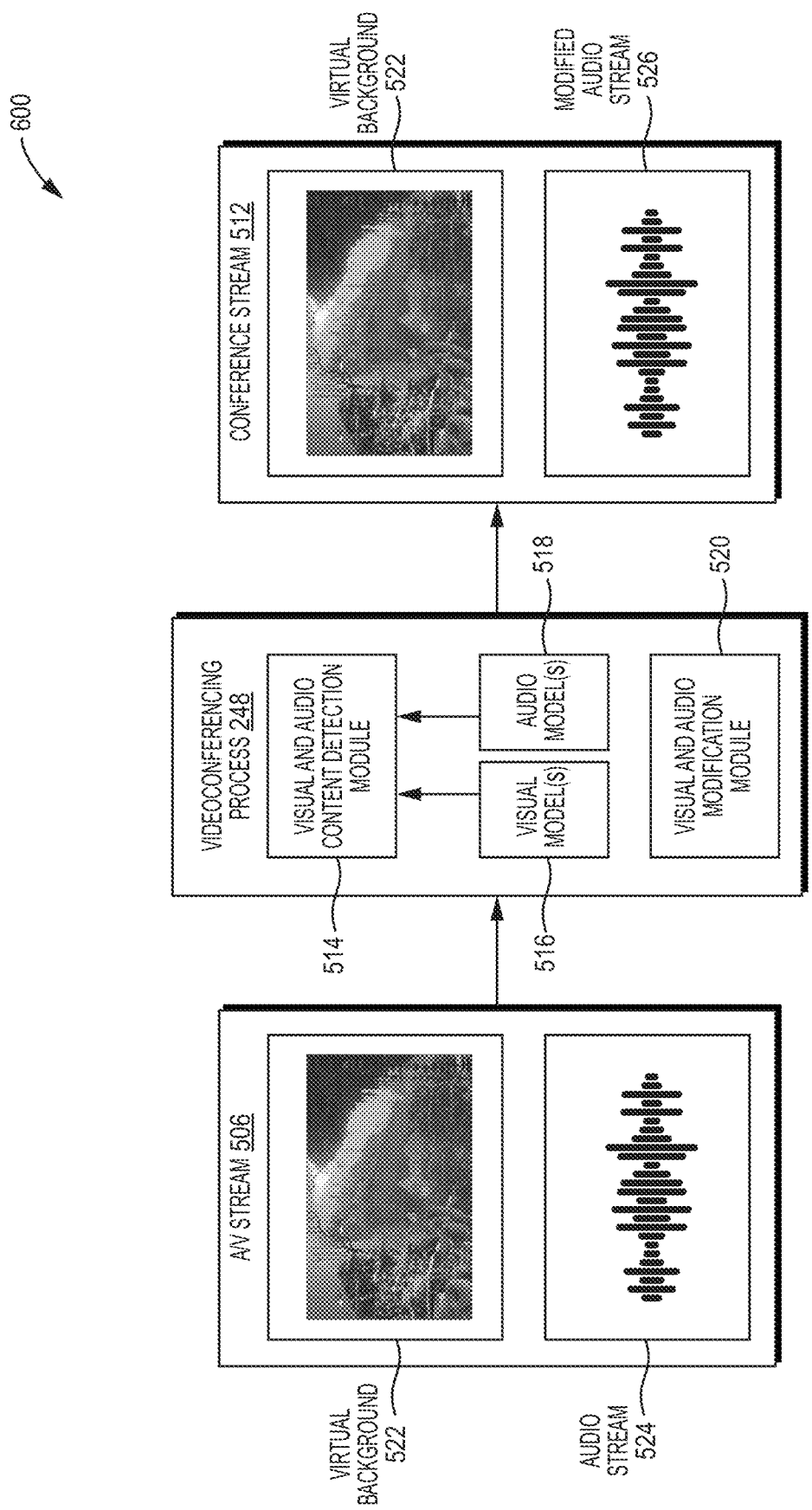
Figure 5C:
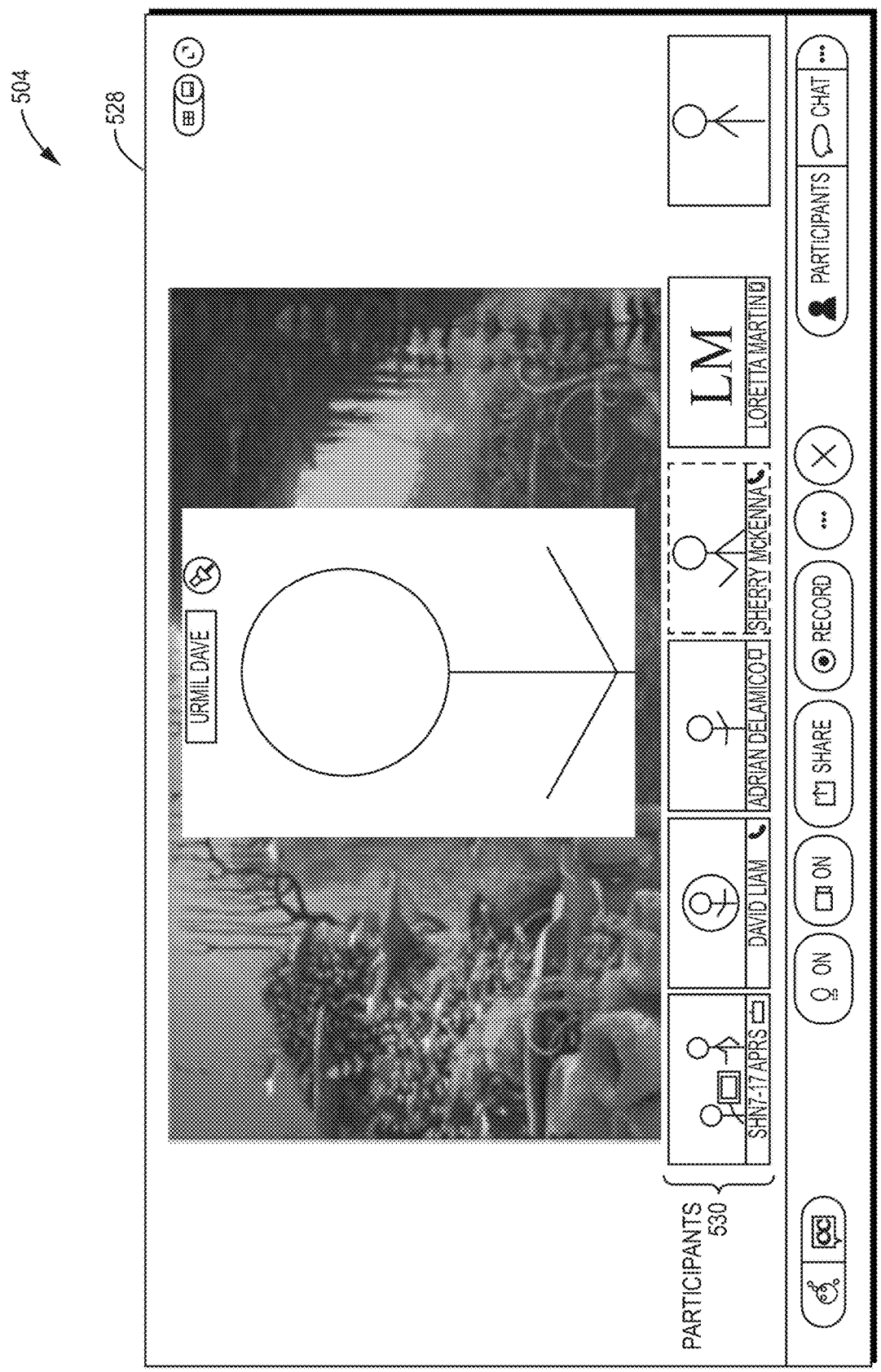

Operationally, FIGS. 5A-C illustrate an example architecture 500 for machine learning-based audio manipulation using virtual backgrounds for virtual meetings, according to various embodiments. At the core of architecture 500 is videoconferencing process 248, which may be executed by a device that provides a videoconferencing (or virtual meeting) service in a network, or another device in communication therewith. Additionally, as shown, architecture 500 may include a first client 502 and a second client 504 that operate in conjunction with one another and videoconferencing process 248, to form a video conference system.

For purposes of illustration, assume that client 502 and client 504 are operated by participants (e.g., end users) of virtual meeting. Each of client 502 and client 504 may generate and send audio-video streams 506, 508 to videoconferencing process 248, where audio-video streams 506, 508 include video captured by a corresponding camera of the clients (e.g., a video of the participant) as well as audio captured by a corresponding microphone of the clients (e.g., a sound recording of the participant). Subsequent to receiving audio-video streams 506, 508, videoconferencing process 248 may be configured to generate and send conference streams 510, 512 to, respectively, client 502 and client 504, where conference streams 510, 512 may be used by the clients to display a virtual meeting (or a videoconference), for example, as described with respect to FIG. 4. It is to be understood that participants at client 502 or client 504 may indicate a selection of a virtual background (e.g., an image file, a context for an image that can be automatically selected, etc.) to be applied to a participant's video of, for example, audio-video streams 506, 508. Videoconferencing process 248 may, after receiving this selection, modify conference streams 510, 512 such that the participant's video includes the virtual background. Additionally, as will be described in greater detail herein, videoconferencing process 248 may also, based on the virtual background, manipulate the participant's audio based on the selected virtual background.

In particular, with reference now to FIG. 5B, more details regarding videoconferencing process 248 are shown. As shown, videoconferencing process 248 may include any or all of the following components: visual and audio content detection module 514, one or more visual machine-learning based models 516, one or more audio machine-learning based models 518, and a visual and audio modification module 520. As would be appreciated, the functionalities of these components may be combined or omitted, as desired. In addition, these components may be implemented on a singular device, for example, device 200, or in a distributed manner, in which case the combination of executing devices can be viewed as their own singular device for purposes of executing videoconferencing process 248.

As described above, videoconferencing process 248 may operate to receive audio-video streams 506 from client 502, where audio-video stream 506 includes an indication 522 of a virtual background that has been selected by a participant at client 502 and an original audio stream 524 that includes audio recordings of the participant. In the example shown in FIG. 5B, the participant has selected a virtual background comprising an image of a sunken treasure ship, presumably deep under the ocean. Visual and audio content detection module 514 may be configured to receive indication 522 (of the image), or even the image file itself, and use it as input to one or more visual machine-learning based models 516 (e.g., a convolutional neural network (CNN) or one or more of the machine learning techniques described above) that have been trained to ascertain (or detect) a visual context of the image. Additionally, visual and audio content detection module 514 may be configured to apply one or more audio machine-learning based models 518 that are configured to map the ascertained visual context to one or more audio filters. The audio filters may comprise a plurality of sound files, a plurality of voice modifications (for the participant's voice), etc. that are related to the visual context and, by extension, the participant's selected visual background.

The audio filters may be understood as including both additions to original audio stream 524 as well as modifications to original audio stream 524 itself. According to one or particular embodiments herein, visual and audio modification module 520 may be configured to consider additions to the original audio stream 524 as background modifications to original audio stream 524 and modifications to original audio stream 524 as foreground modifications. In the example shown in FIG. 5B, an audio filter that has been mapped to the visual context associated with the image of the sunken treasure ship may include bubble sounds or clips (e.g., a background sound addition), a "muffling" filter that modifies a human voice such that the voice appears to be underwater (e.g., a foreground sound modification or enhancement), etc. Furthermore, background sound additions may be understood and categorized, for example, by one or more audio machine-learning based models 518, as "static" or "dynamic" noise additions, where static noises are ones that may be persistently added whenever a participant (that has selected a virtual background) is talking (e.g., chirping bug noise(s), a murmur of a crowd, etc.), while "dynamic" noises are ones that may be tied to animated images, as will be described in greater detail herein below.

It is also contemplated that visual and audio modification module 520 may configured to apply the one or more audio filters in a variety of manners such that white noise mitigation, research, or best practices may be taken into account. Notably, contextual awareness may be applied so that background noise additions are only applied when there is no voice (e.g., of a participant) detected in original audio stream 524. Alternatively, if a voice is detected in original audio stream 524 the background noise additions may be de-emphasized (or faded out) by visual and audio modification module 520. Additionally, degrees/levels may separately be assigned to each of background noise additions and voice enhancements based on a participant's preference (that may be provided via a toggle at a client 502 or client 504).

Visual and audio modification module 520 may then apply the one or more audio filters to the original audio stream 524 to generate a modified audio stream 526. Videoconferencing process 248 may then include modified audio stream 526 as part of conference stream 512, which also includes the indication 522 of the participant's selected virtual background. Client 504 may receive conference stream 512 then present the participant from client 502 to be appear with the virtual background, as shown in the example display 528 of a virtual meeting. According to one or particular embodiments herein, client software at client 502 or client 504 may be configured to locally download the one or more audio filters (that have been mapped by visual and audio content detection module 514 to a visual context of a virtual background) from videoconferencing process 248, and to apply the one or more audio filters on its own (instead of having visual and audio modification module 520 generate conference stream 512).

In one or more additional embodiments, visual and audio content detection module 514 may be configured to obtain feedback from participants (e.g., at client 502) of the virtual meeting regarding conference stream 512 (i.e., such feedback may be in the form of a survey, thumps up/down selections, etc. at the conclusion of the virtual meeting). Visual and audio content detection module 514 may then, based on the obtained feedback, train one or more of the visual machine-learning based models 516 or the audio machine-learning based models 518.

Figure 6B:
FIGS. 6A-6B illustrate example virtual background images.
Figure 6A:
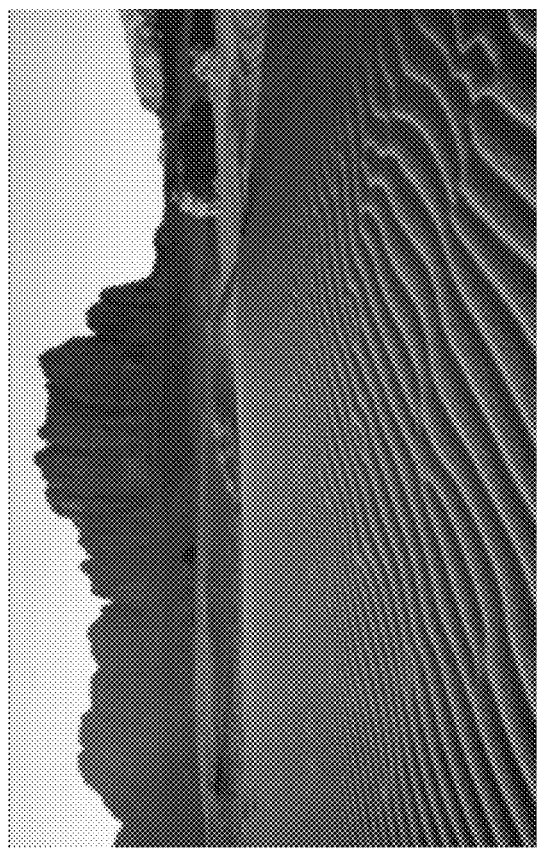

Turning now to FIGS. 6A-6B, example virtual background images are shown. In particular, FIG. 6A illustrates a virtual background image of a desert that may be selected by a participant of a virtual meeting. Visual and audio content detection module 514 may, using this image, be able to ascertain a visual context of this image that is mapped to a plurality of sounds that is associated with a desert image, for example, blowing sand, high winds, etc., which as described above may be considered background modifications (i.e., additions) to an audio stream of a participant. Some foreground modifications for desert-related audio context may comprise a faint-sounding filter, scratchy-voice filter, etc. Turning to FIG. 6B illustrates a virtual background image of a jungle that may be selected by a participant of a virtual meeting. Visual and audio content detection module 514 may, using this image, be able to ascertain a visual context of this image that is mapped to a plurality of sounds that is associated with a jungle image, including animal sounds, bug noises, etc.

Figure 7:
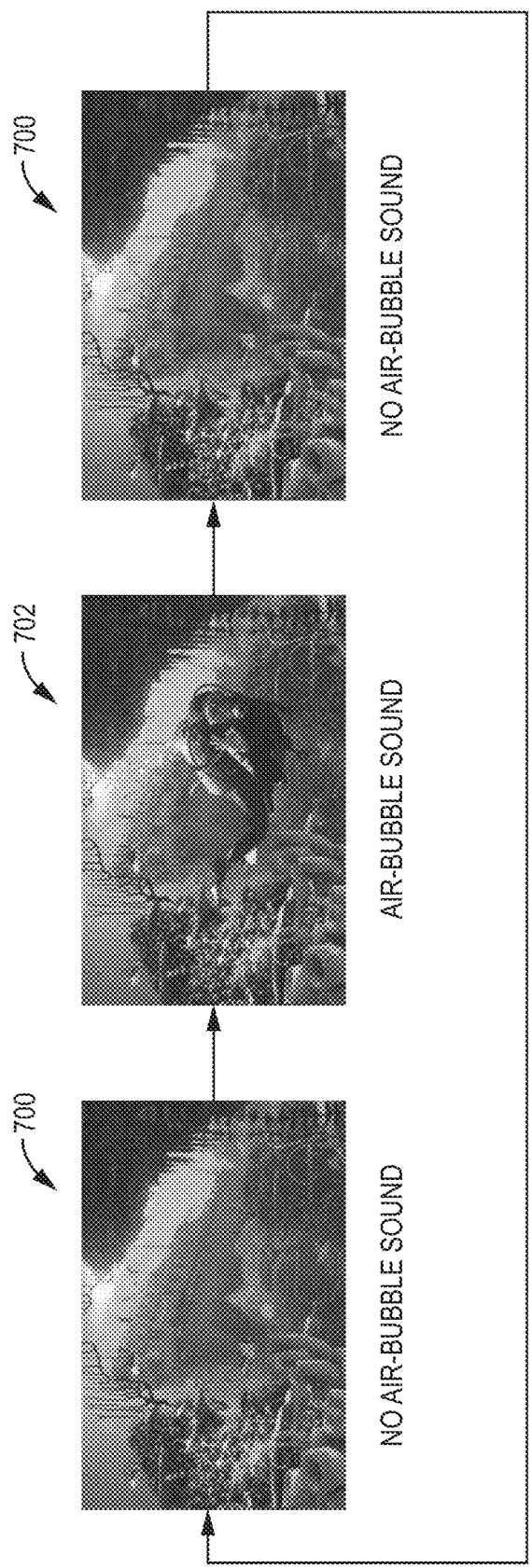
FIG. 7 illustrates an example rotating virtual background.

In one or more additional embodiments, it is contemplated that a virtual background selected by a participant of a virtual meeting may be more than a static image file and may, instead, include an animated image file (e.g., a .gif). Alternatively, it is contemplated that visual and audio content detection module 514 may be configured to identify objects, shapes, etc. that are commonly associated with a visual context associated with a virtual background by a participant, and to insert one or more of these objects into a virtual background. For example, in FIG. 7, an example rotating virtual background is shown that comprises two images, image 702 of an underground setting and image 704 of the underground setting with a diver. Visual and audio modification module 520 may be able to either determine both of these images from an animated image file received from a client (e.g., client 502) or to modify or alter a participant's virtual background (from image 700 to image 702 or from image 702 to image 700) to create this rotating virtual background. Visual and audio modification module 520 may, based on these images 700, 702, be configured to dynamically modify original audio stream 524 such that additions of sound files (e.g., a bubble sound) are only added when objects are detected in the rotating virtual background (for example, when the diver shown in image 702 appears). Voice enhancements (e.g., foreground sound modifications to original audio stream 524) may be applied by visual and audio modification module 520 in each of image 700 and image 702 or, in other embodiments, only when image 700 appears.

Figure 8:
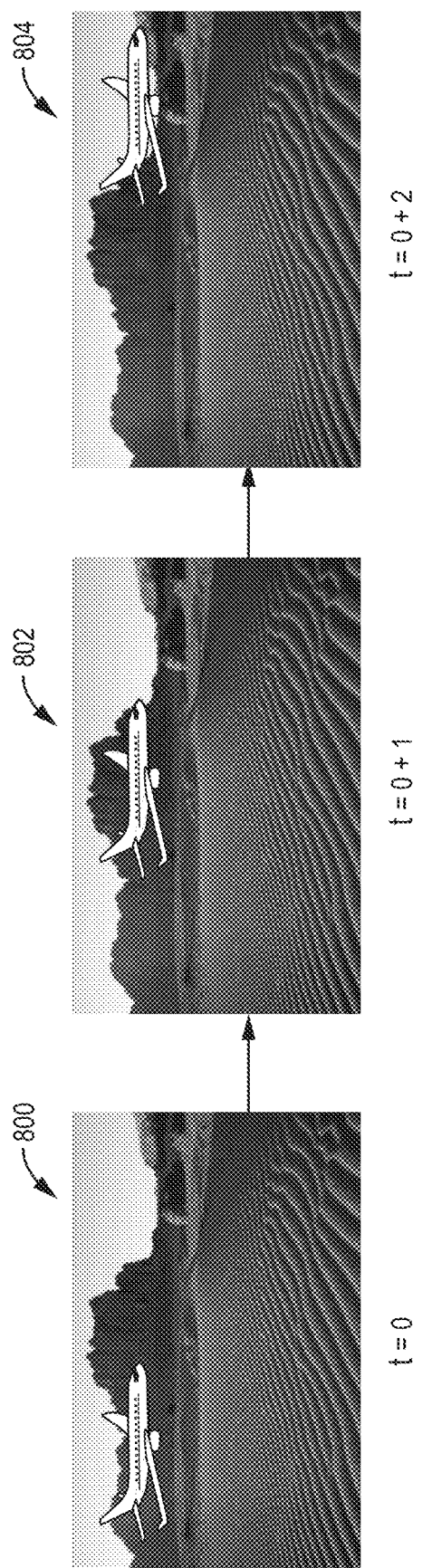
FIG. 8 illustrates an example animated virtual background.

In one or more additional embodiments, visual and audio content detection module 514 in combination with visual and audio modification module 520 may additionally add a spatial element to modification to original audio stream 524. In FIG. 8, an example animated virtual background is shown that comprises image 800, image 802, and image 804. Each of the images includes a desert background, but image 800 at time=0 includes an object (as shown, an airplane) on the left side of the virtual background, image 802 at time=0+1 includes the object in a central portion of the virtual background, and image 804 at time=0+2 includes the object in the right side of the virtual background. Visual and audio content detection module 514 may be configured to detect locations of the object as it "moves" through the virtual background, and visual and audio content detection module 514, based on the objects location, may modify original audio stream 524 such that sound associated with the object are only inserted into a corresponding channel (e.g., left of right) of modified audio stream 526.

Returning to FIG. 5C, example display 528 is of a participant's perspective at client 504, where another participant at client 502 has selected a particular virtual background. In particular, it is contemplated that videoconferencing process 248 may be configured to provide a themed meeting mode option (in addition to a stage (or presenter) mode), where after the selection of a particular virtual background by a participant is applied to one or more other participants 530 of the virtual meeting. In such themed meeting mode, videoconferencing process 248 may equally apply audio modifications to audio streams of each participant, such that each participant would hear the same exact sounds and the background noise would be congruent from a user perspective. For instance, a submarine may appear in the virtual background of a single participant, but an audio clip addition (to conference streams of the all the participants) may be applied for all members of the virtual meeting. It is contemplated, in an example, that if a presenter changes a different participant (of one or more other participants 53) that has a different virtual background, videoconferencing process 248 may be configured to smoothly transition all of the participants to the different virtual background as well as corresponding audio stream modifications/enhancements as described herein.

Figure 9:
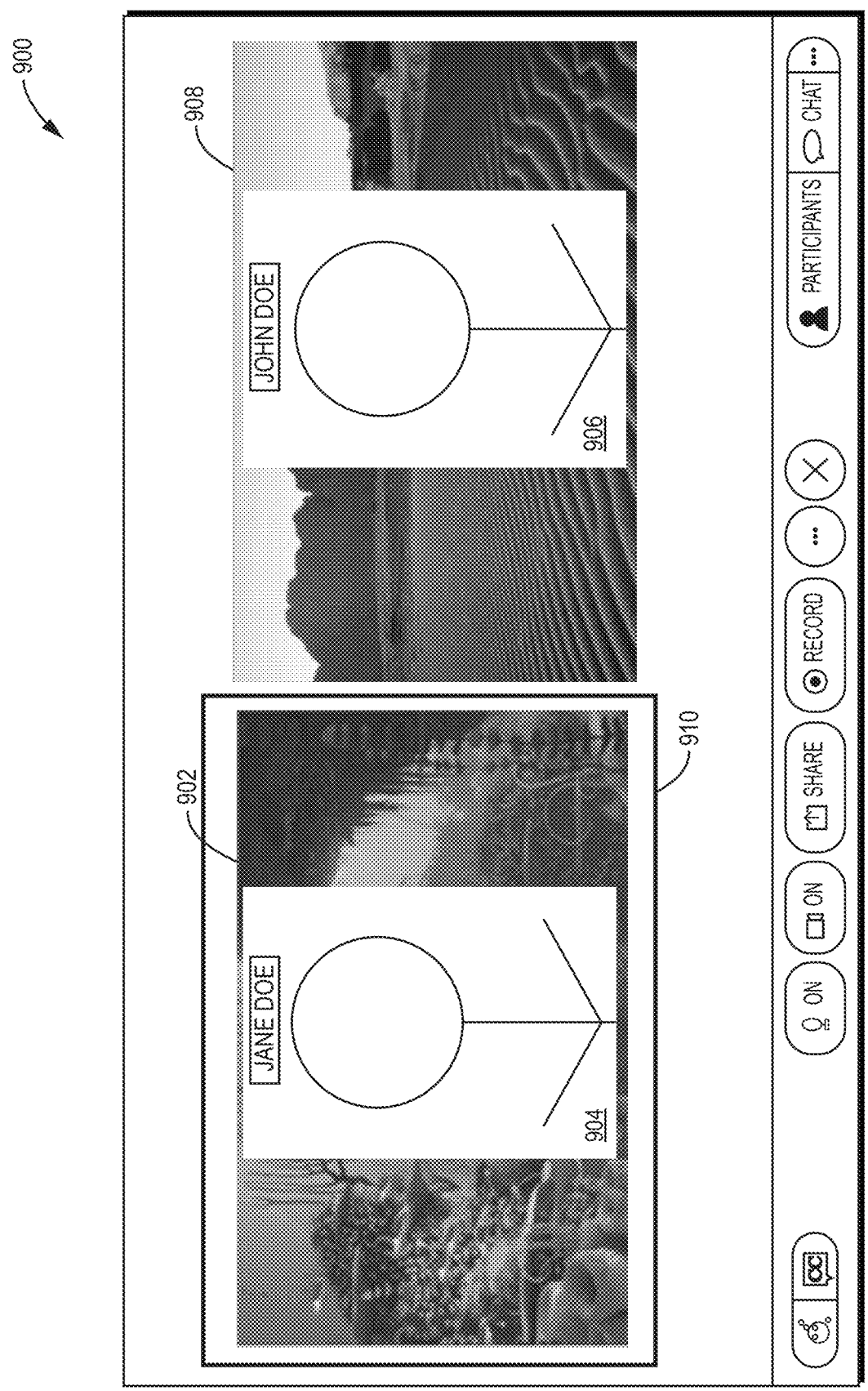
FIG. 9 illustrates an example an example virtual meeting multi-user mode.

In one or more additional embodiments, a separate multi-user mode option may be provided by videoconferencing process 248, where the videoconferencing process 248 may detect when a particular participant is active in a virtual meeting and only apply audio modifications when the participant is active, where the modifications are presented to each participant in the virtual meeting. For example, as shown in FIG. 9 an example virtual meeting multi-user mode 900 is shown. The virtual meeting includes a first participant 902 who has selected a particular virtual background 904 and a second participant 906 who has selected another virtual background 908. Additionally, an indicator 910 indicates that first participant 902 is actively speaking, and videoconferencing process 248 may be configured to detect the speech of first participant 902 and to apply audio stream modifications to an audio stream associated with first participant 902, according to the techniques described herein above.

In one or more additional embodiments, it is contemplated that videoconferencing process 248 may be configured to only apply audio modifications based on a selected virtual background when no other participants are present in a virtual meeting. This may lobby mode of the virtual meeting, where the participant waits for participation by other members of the virtual meeting. In such a mode, the modifications to the audio stream of the participant may be heard in the participant's own stream, so that they may adjust or test out the sound. Alternatively, videoconferencing process 248 may be configured to apply audio modifications in a separate waiting area (or room), for example, prior to a virtual meeting starting and modify a participant's own audio stream such that the participant itself may have its own audio stream modified with additions associated with a self-selected virtual background. Furthermore, it is contemplated that videoconferencing process 248 may be configured to present a variety of toggles within displays of virtual meetings to enable participants to: disable audio stream modifications, entirely or in part; adjust the degree to which various types of audio stream additions and/or modifications are applied (e.g., how intense they are); etc.

Figure 10:
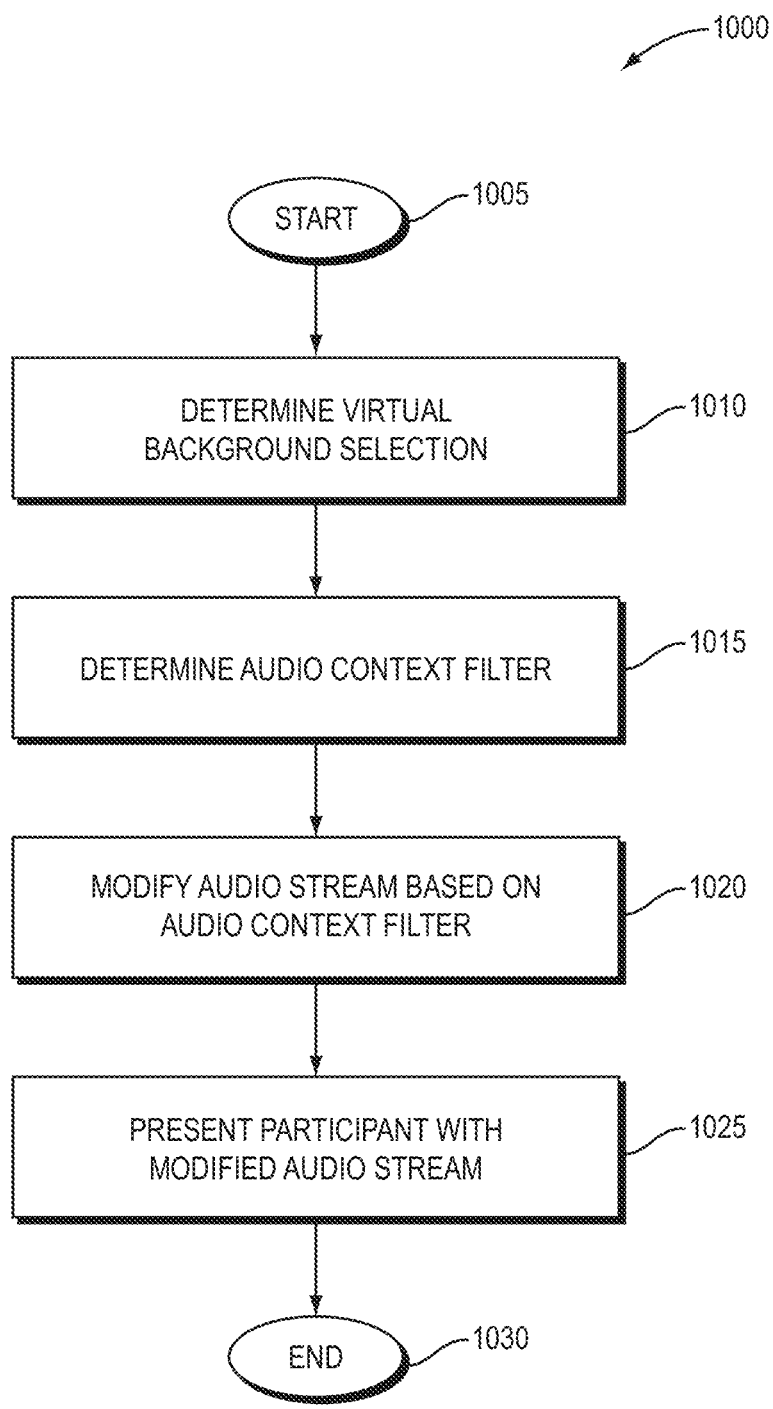
FIG. 10 illustrates an example simplified procedure for machine learning-based audio manipulation using virtual backgrounds for virtual meetings in accordance with one or more embodiments described herein.

In closing, FIG. 10 illustrates an example simplified procedure for machine learning-based audio manipulation using virtual backgrounds for virtual meetings in accordance with one or more embodiments described herein, particularly from the perspective of a teleconference provider server or local end user/participant device, depending upon implementation. For example, a non-generic, specifically configured device (e.g., device 200) may perform procedure 1000 by executing stored instructions (e.g., process 248). The procedure 1000 may start at step 1005, and continues to step 1010, where, as described in greater detail above, a videoconference service may determine a selection of a virtual background for a videoconference from a particular participant of a plurality of participants in the videoconference. In an embodiment, videoconference service may apply the selection of the virtual background for the videoconference from the particular participant to the plurality of participants. In one particular embodiment, the virtual background may comprise an animated image file. In an embodiment, the videoconference service may be located within a cloud service or on endpoint devices of the plurality of participants.

At step 1015, the videoconference service may determine an audio context filter that is associated with a visual context of the virtual background. In an embodiment, the videoconference service ascertains the visual context of the virtual background based on applying a machine learning model to the virtual background. In particular, the videoconference service may apply the virtual background one or more visual machine-learning based models (e.g., a convolutional neural network (CNN) or one or more of the machine learning techniques described above) that have been trained to ascertain (or detect) a visual context of the image. Additionally, the videoconference service may be configured to apply one or more audio machine-learning based models that are configured to map the ascertained visual context to one or more audio filters.

At step 1020, the videoconference service may modify an audio stream of the videoconference into a modified audio stream according to the audio context filter. In an embodiment, modifying the audio stream of the videoconference into the modified audio stream according to the audio context filter may comprises adding, by the videoconference service, one or more audio clips associated with the audio context filter to the audio stream. In a further embodiment, adding the one or more audio clips may be based on whether an object is detected within the virtual background. In one particular embodiment, modifying the audio stream of the videoconference into the modified audio stream according to the audio context filter may comprise augmenting, by the videoconference service, a voice portion of the audio stream with a voice modification associated with the audio context filter.

At step 1025, the videoconference service may present, to the plurality of participants during the videoconference, the particular participant using the virtual background and the modified audio stream. In an embodiment, presenting, to the plurality of participants during the videoconference, the particular participant using the virtual background and the modified audio stream may be based on whether the videoconference service has detected that the particular participant is speaking. In one particular embodiment, the videoconference service may present a toggle to each of the plurality of participants that allows a corresponding participant to disable the modified audio stream. In another embodiment, the videoconference service may present a toggle to each of the plurality of participants that allows a corresponding participant to select whether static audio clips or dynamic audio clips are added to the audio stream The simplified procedure 1000 may then end in step 1030, notably with the ability to continue ingesting and clustering data. Other steps may also be included generally within procedure 1000. For example, such steps (or, more generally, such additions to steps already specifically illustrated above), may include: ascertaining, by the videoconference service, the visual context of the virtual background based on applying a machine learning model to the virtual background; obtaining, by the videoconference service and from the plurality of participants, feedback regarding the virtual background and the modified audio stream; and training, by the videoconference service, the machine learning model based on the feedback; and so on.

It should be noted that while certain steps within procedure 1000 may be optional as described above, the steps shown in FIG. 10 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for machine learning-based audio manipulation using virtual backgrounds for virtual meetings. In particular, the techniques herein, in addition to applying the virtual background to a video stream of the participant, leverage machine learning techniques to automatically detect one or more audio enhancements that may be applied to an audio stream associated with a participant, based on a virtual background selected the participant. The participant may then be presented with his or her audio being modified with the audio enhancements (in addition to the virtual background). Further, the techniques herein may be configured to detect objects within a virtual background, and accordingly modify the audio stream based on the presence of the objects, for example, for when animated image files are used as virtual backgrounds. In addition, the techniques herein may be configured in a manner that corresponds to different modes of a virtual meeting (e.g., a lobby mode, a themed meeting, or a stage mode).

Illustratively, the techniques described herein may be performed by hardware, software, and/or firmware, such as in accordance with the illustrative videoconferencing process 248, which may include computer executable instructions executed by the processor 220 to perform functions relating to the techniques described herein, e.g., in conjunction with corresponding processes of other devices in the computer network as described herein (e.g., on computing devices, servers, etc.). In addition, the components herein may be implemented on a singular device or in a distributed manner, in which case the combination of executing devices can be viewed as their own singular "device" for purposes of executing the process 248.

According to the embodiments herein, an illustrative method herein may comprise: determining, by a videoconference service, a selection of a virtual background for a videoconference from a particular participant of a plurality of participants in the videoconference; determining, by the videoconference service, an audio context filter that is associated with a visual context of the virtual background; modifying, by the videoconference service, an audio stream of the videoconference into a modified audio stream according to the audio context filter; and presenting, by the videoconference service and to the plurality of participants during the videoconference, the particular participant using the virtual background and the modified audio stream.

In one embodiment, modifying the audio stream of the videoconference into the modified audio stream according to the audio context filter comprises: adding, by the videoconference service, one or more audio clips associated with the audio context filter to the audio stream. In one embodiment, adding the one or more audio clips is based on whether an object is detected within the virtual background. In one embodiment, modifying the audio stream of the videoconference into the modified audio stream according to the audio context filter comprises: augmenting, by the videoconference service, a voice portion of the audio stream with a voice modification associated with the audio context filter. In one embodiment, presenting, by the videoconference service and to the plurality of participants during the videoconference, the particular participant using the virtual background and the modified audio stream is based on whether the videoconference service has detected that the particular participant is speaking. In one embodiment, the videoconference service applies the selection of the virtual background for the videoconference from the particular participant to the plurality of participants. In one embodiment, the virtual background comprises an animated image file. In one embodiment, the videoconference service presents a toggle to each of the plurality of participants that allows a corresponding participant to disable the modified audio stream. In one embodiment, the videoconference service presents a toggle to each of the plurality of participants that allows a corresponding participant to select whether static audio clips or dynamic audio clips are added to the audio stream. In one embodiment, the videoconference service is located within a cloud service or on endpoint devices of the plurality of participants. In one embodiment, the illustrative method herein may further comprise ascertaining, by the videoconference service, the visual context of the virtual background based on applying a machine learning model to the virtual background. In one embodiment, the illustrative method herein may further comprise: obtaining, by the videoconference service and from the plurality of participants, feedback regarding the virtual background and the modified audio stream; and training, by the videoconference service, the machine learning model based on the feedback.

According to the embodiments herein, an illustrative tangible, non-transitory, computer-readable medium herein may have computer-executable instructions stored thereon that, when executed by a processor on a computer, may cause the computer to perform a method comprising: determining a selection of a virtual background for a videoconference from a particular participant of a plurality of participants in the videoconference; determining an audio context filter that is associated with a visual context of the virtual background; modifying an audio stream of the videoconference into a modified audio stream according to the audio context filter; and presenting, to the plurality of participants during the videoconference, the particular participant using the virtual background and the modified audio stream.

Further, according to the embodiments herein an illustrative apparatus herein may comprise: one or more network interfaces to communicate with a network; a processor coupled to the network interfaces and configured to execute one or more processes; and a memory configured to store a process that is executable by the processor, the process, when executed, configured to: determine a selection of a virtual background for a videoconference from a particular participant of a plurality of participants in the videoconference; determine an audio context filter that is associated with a visual context of the virtual background; modify an audio stream of the videoconference into a modified audio stream according to the audio context filter; and present, to the plurality of participants during the videoconference, the particular participant using the virtual background and the modified audio stream.

While there have been shown and described illustrative embodiments above, it is to be understood that various other adaptations and modifications may be made within the scope of the embodiments herein. For example, while certain embodiments are described herein with respect to certain types of networks in particular, the techniques are not limited as such and may be used with any computer network, generally, in other embodiments. Moreover, while specific technologies, protocols, and associated devices have been shown, such as such as for videoconferencing services, other suitable technologies, protocols, and associated devices may be used in accordance with the techniques described above, such as one-on-one video communication protocols (e.g., video calls). In addition, while certain devices are shown, and with certain functionality being performed on certain devices, other suitable devices and process locations may be used, accordingly. That is, the embodiments have been shown and described herein with relation to specific network configurations (orientations, topologies, protocols, terminology, processing locations, etc.). However, the embodiments in their broader sense are not as limited, and may, in fact, be used with other types of networks, protocols, and configurations.

Moreover, while the present disclosure contains many other specifics, these should not be construed as limitations on the scope of any embodiment or of what may be claimed, but rather as descriptions of features that may be specific to particular embodiments of particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:
    determining, by a videoconference service, a selection of a virtual background for a videoconference from a particular participant of a plurality of participants in the videoconference, wherein the virtual background comprises an animated image file;
    ascertaining, by the videoconference service and by applying a machine learning model, a visual context of the virtual background among a plurality of visual contexts that are associated with different visual settings;
    determining, by the videoconference service, an audio context filter that is associated with the visual context of the virtual background;
    modifying, by the videoconference service, an audio stream of the videoconference into a modified audio stream according to the audio context filter; and
    presenting, by the videoconference service and to the plurality of participants during the videoconference, the particular participant using the virtual background and the modified audio stream.

2. The method as in claim 1, wherein modifying the audio stream of the videoconference into the modified audio stream according to the audio context filter comprises:
    adding, by the videoconference service, one or more audio clips associated with the audio context filter to the audio stream.

3. The method as in claim 2, wherein adding the one or more audio clips is based on whether an object is detected within the virtual background.

4. The method as in claim 1, wherein modifying the audio stream of the videoconference into the modified audio stream according to the audio context filter comprises:
    augmenting, by the videoconference service, a voice portion of the audio stream with a voice modification associated with the audio context filter.

5. The method as in claim 1, wherein presenting, by the videoconference service and to the plurality of participants during the videoconference, the particular participant using the virtual background and the modified audio stream is based on whether the videoconference service has detected that the particular participant is speaking.

6. The method as in claim 1, wherein the videoconference service applies the selection of the virtual background for the videoconference from the particular participant to the plurality of participants.

7. The method as in claim 1, wherein the videoconference service presents a toggle to each of the plurality of participants that allows a corresponding participant to disable the modified audio stream.

8. The method as in claim 1 wherein the videoconference service presents a toggle to each of the plurality of participants that allows a corresponding participant to select whether static audio clips or dynamic audio clips are added to the audio stream.

9. The method as in claim 1 wherein the videoconference service is located within a cloud service or on endpoint devices of the plurality of participants.

10. The method as in claim 1, further comprising:
obtaining, by the videoconference service and from the plurality of participants, feedback regarding the virtual background and the modified audio stream; and
training, by the videoconference service, the machine learning model based on the feedback.

11. A tangible, non-transitory, computer-readable medium having computer-executable instructions stored thereon that, when executed by a processor on a computer, cause the computer to perform a method comprising:
determining a selection of a virtual background for a videoconference from a particular participant of a plurality of participants in the videoconference, wherein the virtual background comprises an animated image file;
ascertaining, by applying a machine learning model, a visual context of the virtual background among a plurality of visual contexts that are associated with different visual settings;
determine an audio context filter that is associated with the visual context of the virtual background;
modifying an audio stream of the videoconference into a modified audio stream according to the audio context filter; and
presenting, to the plurality of participants during the videoconference, the particular participant using the virtual background and the modified audio stream.

12. The tangible, non-transitory, computer-readable medium as in claim 11, wherein modifying the audio stream of the videoconference into the modified audio stream according to the audio context filter comprises:
adding one or more audio clips associated with the audio context filter to the audio stream.

13. The tangible, non-transitory, computer-readable medium as in claim 11, wherein modifying the audio stream of the videoconference into the modified audio stream according to the audio context filter comprises:
adding one or more audio clips associated with the audio context filter to the audio stream.

14. The tangible, non-transitory, computer-readable medium as in claim 13, wherein adding the one or more audio clips is based on whether an object is detected within the virtual background.

15. The tangible, non-transitory, computer-readable medium as in claim 11, wherein modifying the audio stream of the videoconference into the modified audio stream according to the audio context filter comprises:
augmenting a voice portion of the audio stream with a voice modification associated with the audio context filter.

16. The tangible, non-transitory, computer-readable medium as in claim 11, wherein presenting, to the plurality of participants during the videoconference, the particular participant using the virtual background and the modified audio stream is based on whether the particular participant is detected as speaking.

17. The tangible, non-transitory, computer-readable medium as in claim 11, wherein the selection of the virtual background for the videoconference from the particular participant is applied to the plurality of participants.

18. An apparatus, comprising:
one or more network interfaces to communicate with a network;
a processor coupled to the one or more network interfaces and configured to execute one or more processes; and
a memory configured to store a process that is executable by the processor, the process, when executed, configured to:
determine a selection of a virtual background for a videoconference from a particular participant of a plurality of participants in the videoconference, wherein the virtual background comprises an animated image file;
ascertain, by applying a machine learning model, a visual context of the virtual background among a plurality of visual contexts that are associated with different visual settings;
determine an audio context filter that is associated with the visual context of the virtual background;
modify an audio stream of the videoconference into a modified audio stream according to the audio context filter; and
present, to the plurality of participants during the videoconference, the particular participant using the virtual background and the modified audio stream.

* * * * *